(12) United States Patent
Putnam

(10) Patent No.: US 11,675,868 B2
(45) Date of Patent: Jun. 13, 2023

(54) DYNAMIC SERVICE WORKER CODE FOR STORING INFORMATION IN WEB BROWSER

(71) Applicant: KOUNT INC., Boise, ID (US)

(72) Inventor: Arthur Jacob Putnam, Meridian, ID (US)

(73) Assignee: KOUNT INC., Boise, ID (US)

( * ) Notice: Subject to any disclaimer, the term of this patent is extended or adjusted under 35 U.S.C. 154(b) by 0 days.

(21) Appl. No.: 17/391,749

(22) Filed: Aug. 2, 2021

(65) Prior Publication Data

US 2022/0043881 A1 Feb. 10, 2022

Related U.S. Application Data

(60) Provisional application No. 63/063,131, filed on Aug. 7, 2020.

(51) Int. Cl.
| | |
|---|---|
| *G06F 16/957* | (2019.01) |
| *G06F 8/51* | (2018.01) |
| *G06F 8/71* | (2018.01) |
| *G06F 16/9535* | (2019.01) |

(52) U.S. Cl.
CPC ............ *G06F 16/9577* (2019.01); *G06F 8/51* (2013.01); *G06F 8/71* (2013.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 7,103,714 | B1 * | 9/2006 | Jacobs | G06F 16/9574 709/228 |
| 7,188,305 | B1 * | 3/2007 | Corbin | G06F 16/957 715/255 |
| 9,363,134 | B1 * | 6/2016 | Goodspeed | G06F 16/958 |
| 9,639,626 | B2 * | 5/2017 | Gnech | G06F 16/955 |
| 10,666,431 | B1 * | 5/2020 | Nguyen | H04L 9/0841 |
| 2005/0160104 | A1 * | 7/2005 | Meera | G06F 8/36 |
| 2008/0228762 | A1 * | 9/2008 | Tittizer | G06F 8/73 707/999.005 |
| 2011/0161403 | A1 * | 6/2011 | Fu | H04L 67/2842 715/764 |
| 2011/0296381 | A1 * | 12/2011 | Mooney | G06F 8/423 717/122 |

(Continued)

*Primary Examiner* — Howard Cortes
(74) *Attorney, Agent, or Firm* — Kilpatrick Townsend & Stockton LLP

(57) ABSTRACT

Systems and methods for storing information in a web browser by dynamically generating service worker codes are provided. In one example, an online system receives a request from a client device to store data included in the request in a service worker code. The online system modifies a source code of a particular service worker code to include the data to be stored and transmits the modified service worker code to the client device. The client device receives and stores the modified service worker code embedded with the data. The client device receives a request for a particular data associated with a web page and determines that the modified service worker code contains the requested particular data. The client device retrieves the requested particular data from the modified service worker code and updates the web page with the retrieved particular data.

19 Claims, 6 Drawing Sheets

(56) References Cited

U.S. PATENT DOCUMENTS

2015/0193397 A1\* 7/2015 Grieve ................ G06F 16/9574
715/234
2018/0150528 A1\* 5/2018 Shah ..................... G06F 16/254

\* cited by examiner

SERVICE WORKER CODE BEFORE STORING DATA

```
//GLOBAL VARIABLES

CONST GLOBAL_VAR1 = 100;
CONST GLOBAL_VAR5 = 'TEMP';
...

THIS.ADDEVENTLISTENER('INSTALL', FUNCTION(EVENT) {
    EVENT.WAITUNTIL(
        CACHES.OPEN('CACHE_FIRST_V1.0').THEN(FUNCTION(CACHE) {
            RETURN CACHE.ADDALL([
                '/OFFLINE-WEB-APPS/SERVICE_WORKERS/CACHE_FIRST/',
                '/OFFLINE-WEB-APPS/SERVICE_WORKERS/CACHE_FIRST/INDEX.HTML',
                '/OFFLINE-WEB-APPS/SERVICE_WORKERS/CACHE_FIRST/STYLE.CSS',
                '/OFFLINE-WEB-APPS/SERVICE_WORKERS/CACHE_FIRST/ABOUT.HTML'
            ]);
        })
    );
});

SELF.ADDEVENTLISTENER('FETCH', FUNCTION(EVENT) {
    EVENT.RESPONDWITH(
        CACHES.MATCH(EVENT.REQUEST)
            .THEN(FUNCTION(RESPONSE) {
                IF (RESPONSE) {
                    RETURN RESPONSE;
                }
                RETURN FETCH(EVENT.REQUEST);
            })
    );
});
```

SERVICE WORKER CODE AFTER STORING DATA

```
//GLOBAL VARIABLES
CONST DEVICE_ID = 2;
CONST USER_NAME = 'USER1';

CONST GLOBAL_VAR1 = 100;
CONST GLOBAL_VAR5 = 'TEMP';
...

THIS.ADDEVENTLISTENER('INSTALL', FUNCTION(EVENT) {
    EVENT.WAITUNTIL(
        CACHES.OPEN('CACHE_FIRST_V1.0').THEN(FUNCTION(CACHE) {
            RETURN CACHE.ADDALL([
                '/OFFLINE-WEB-APPS/SERVICE_WORKERS/CACHE_FIRST/',
                '/OFFLINE-WEB-APPS/SERVICE_WORKERS/CACHE_FIRST/INDEX.HTML',
                '/OFFLINE-WEB-APPS/SERVICE_WORKERS/CACHE_FIRST/STYLE.CSS',
                '/OFFLINE-WEB-APPS/SERVICE_WORKERS/CACHE_FIRST/ABOUT.HTML'
            ]);
        })
    );
});

SELF.ADDEVENTLISTENER('FETCH', FUNCTION(EVENT) {
    EVENT.RESPONDWITH(
        CACHES.MATCH(EVENT.REQUEST)
            .THEN(FUNCTION(RESPONSE) {
                IF (RESPONSE) {
                    RETURN RESPONSE;
                }
                RETURN FETCH(EVENT.REQUEST);
            })
    );
});
```

DYNAMIC SERVICE WORKER CODE FOR STORING INFORMATION IN WEB BROWSER

CROSS-REFERENCE TO RELATED APPLICATIONS

This claims priority to U.S. Provisional Application No. 63/063,131, entitled "Dynamically Generated Service Worker Code to Store Information in Web Browser," filed on Aug. 7, 2020, which is hereby incorporated in its entirety by this reference.

TECHNICAL FIELD

The present disclosure relates generally to data storage management for a web browser used with the Internet. More specifically, but not by way of limitation, this disclosure relates to storing data in a web browser by dynamically generating service worker code.

BACKGROUND

While browsing Internet sites, the website may cause a browser of a client device to store information (such as stateful information). The information is typically stored using cookies or other storage mechanisms, such as session storage. For example, a cookie can store shopping cart information while a user browses an online marketplace. In another example, a cookie can store authentication information used by the webserver to determine if a user is logged in or not. But, the stored data are temporary files and are periodically deleted by the browser. For example, cookies are deleted whenever a browsing session ends such as when the browser is closed, (and persistent cookies are deleted upon the expiration date of the cookie. Moreover, cookies can be manually deleted by users by instructing the web browser to clear temporary files or by executing third-party cleaning tools. In view of data deletion, the existing web browser storage mechanisms are not suitable for applications that would benefit from the information being stored for long periods of time.

SUMMARY

Various aspects of the present disclosure provide systems and methods for storing information in a web browser by dynamically generating service worker code. In one example, a client device sends, to an online system, a request to store data in a service worker code. The request includes the data to be stored. The client devices stores the service worker code that is embedded with the data and that is received from the online system. The client device receives a request for a particular data associated with a web page and parses the service worker code to retrieve the requested particular data in response to the request for the particular data. The client device further updates the web page based on the retrieved particular data.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

FIG. 3 illustrates an example of a service worker code before and after storing data, according to some aspects described herein.

DETAILED DESCRIPTION

Figure 1:
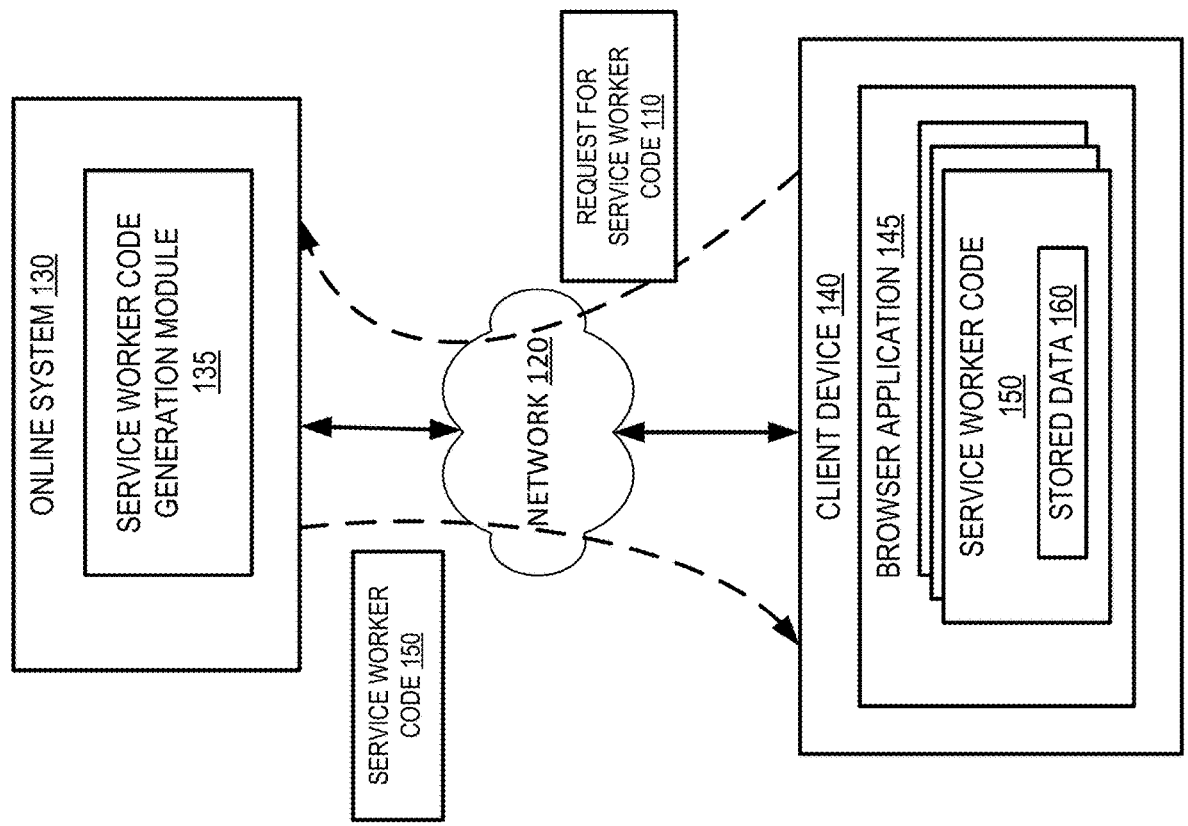
FIG. 1 is a diagram of an example of a computing environment in which information is stored in a web browser through dynamically generated service worker code, according to some aspects described herein.

Certain aspects and features of the present disclosure involve storing information in a web browser by dynamically generating service worker code. Service worker codes are scripts that are installed in a web browser of a client device to implement certain functions. The web browser can run the scripts in the background, separate from the JavaScript of a web page that the service worker is associated with, to enable asynchronous functionality of the web page. Because of its functionality, service worker code is less likely to be deleted by users or third-party tools. Therefore, storing data in the service worker code makes the data available to the web browser for a longer period of time than other storing mechanisms such as cookies.

For example, a client device can send a request to access an online system, such as requesting a web page from the online system. In response, the online system returns the requested web page to the client device for display in a web browser. The client device can further interact with the online system based on the operations performed with respect to the web page in the web browser, such as sending user login information, sending requests for additional web pages or contents, and so on. The online system can provide responses based on these operations, such as authenticating users, sending requested additional web pages or contents.

Some data generated or otherwise provided to the client device can be stored at the client device to avoid repeated requests from the online system thereby reducing network bandwidth consumption and response time. These data can include, but are not limited to, the authentication information for a user, the device identification number of the client device, images, or other content on the webpage. To store data, the client device (e.g., the JavaScript executing in the web browser of the client device) can send a request to the online system. The request can specify the data to be stored and ask for a service worker code to store the data. In response to receiving the request to store data, the online system retrieves a service worker code and modifies the source code of the service worker code to add the data to be stored. For example, the data can be added to the source code of the service worker code as a global value, a constant value, or a combination thereof. The data can also be added to the source code in other ways as long as the web browser (e.g., the JavaScript) on the client device understands how to extract the stored data and the added data does not interfere with the functions of the service worker code. The online system further updates the version number of the service worker code to distinguish the modified service worker code from its previous versions. The online system can send the modified service worker code embedded with the data to the client device.

The online system can select the service worker code for embedding the data to be a service worker code that is needed by the web browser on the client device, for example, to implement a function facilitating the operations of the web browser. In other examples, the service worker code is not required by the web browser and is used mainly to store data. In another example, the client device can specify the service worker code used for storing the data. For instance, the client device (e.g., the JavaScript executing in the web browser) can determine the service worker code installed on the client device and select one according to criteria such as the name or function of the service worker code. The client device can include an identifier of the selected service worker code in the request to store data. The online system can use the service worker code identified in the request to store data as described above. In some examples, the service worker code selected by the client device has data stored therein. Depending on the new data to be stored, the online system can update the stored data or add additional data to the service worker code.

In response to receiving a service worker code, the client device can check the version number of the received service worker code and determine whether to install the service worker code as a new service worker code or replace an existing service worker code. If the web browser receives a new request to access the online system, such as a refresh request for the current web page, the web browser can check the stored data for information needed to respond to the request before sending out the request to the online system. To do so, the web browser can parse the service worker code to locate the stored data and then extract the stored data to satisfy the request. For example, in response to the refresh request, the web browser can read the service worker code storing data for the current web page and search for the global variable or the comment configured to store data such as the authentication identification number for the current user and retrieve the identification number. In this way, the user does not need to re-enter the login information and the web browser does not need to send a request to the online system for user authentication. Other information can be retrieved similarly.

Certain aspects provide improvements to the online web page access. As discussed above, web browsers often store information using temporary storage mechanisms, such as cookies or session storage. Data stored using these temporary storage mechanisms often have a short time to live. The mechanism for storing information in a web browser by dynamically generating service worker code can provide long-term storage of data in a web browser thereby extending the time to live of the stored data. This allows the stored data to be used in many different sessions of the website visits which improves the efficiency of operating the website and reduces the network bandwidth consumption and the response time.

The illustrative examples herein are given to introduce the reader to the general subject matter discussed and are not intended to limit the scope of the disclosed concepts. The following sections describe various additional features and examples with reference to the drawings in which like numerals indicate like elements, and in which descriptions are used to describe the illustrative examples but, like the illustrative examples, should not be used to limit the present disclosure.

Operating Environment Example for Storing Information in a Web Browser by Dynamically Generating Service Worker Code FIG. 1 is a diagram of an example of a computing environment 100 in which information is stored in a browser application 145 through dynamically generated service worker code 150, according to some aspects described herein. The computing environment 100 shown by FIG. 1 includes an online system 130, a client device 140, and a network 120. In alternative configurations, different and/or additional components may be included in the computing environment 100.

The client device 140 may be a computing device or other communication device operated by a user, such as a consumer or a customer. The client device 140 can include one or more computing devices, such as laptops, smartphones, or other personal computing devices. Alternatively, a client device 104 may be a device having computer functionality, such as a personal digital assistant (PDA), a mobile telephone, or another suitable device. A client device 104 can include executable instructions stored in one or more non-transitory computer-readable media. In one aspect, the client device 140 executes an application allowing a user of the client device 140 to interact with the online system 130. For example, as depicted in FIG. 1, a client device 140 executes a browser application 145 to enable interaction between the client device and the online system 130 via the network 120. In another aspect, a client device 140 interacts with the online system 130 through an application programming interface (API) running on a native operating system of the client device 140, such as IOS® or ANDROID™.

Each communication within the computing environment 100 may occur over one or more networks 120. A network 120 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the network.

In some aspects, the network 120 includes communication technologies and protocols such as Ethernet, 802.11, worldwide interoperability for microwave access (WiMAX), 3G, 4G, code division multiple access (CDMA), digital subscriber line (DSL), etc. Examples of networking protocols used for communicating via the network 120 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some aspects, some or all of the communication links of the network 120 may be encrypted using any suitable technique or techniques.

The client device 140 is configured to execute a browser application 145. The browser application 145 can include one or more service worker codes 150. Service worker codes 150 may be scripts that the browser application 145 may run in the background. For example, the browser application 145 may execute JavaScript code sent from the online system 130 to display a web page. Meanwhile, the service worker code 150 may be executed in the background to implement other functions for the browser application 145. These functions may be used for specifying how to handle network requests for specific assets. In some examples, service worker scripts can be used to support different caching and fetching patterns. For instance, there may be an asset that changes infrequently and is stored in the cache of the browser application 145. A service worker code can be used to create a cache-first access pattern. In a cache-first access pattern, the service worker code will first check the browser cache before making a network request. If that asset is found in the cache, then the service worker will return the cached version of the asset. If the asset is not found in the cache, then the original network request will be made. In another scenario, the cached value is used if the network request fails or takes too long. In this case, the service worker code can be written to first make the network request and if the network request fails or takes too long then the service worker code will use the cached version. More advanced fetching and caching patterns can be applied such as returning the cached version immediately but still making the network request to update the cache once the network request is finished.

When web requests are initiated, the browser application 145 may also determine how to handle the web requests based on the data stored locally based on the data stored in the service worker code. For example, the JavaScript in the browser application 145 may determine, based on stored data 160 within the service worker code 150, whether to handle a web request locally using the stored data 160 or send the web request to the online system 130. In some examples, when the browser application 145 accesses a domain that has a service worker code 150 registered, the browser application 145 may determine if the service worker code 150 corresponding to the accessed domain is already installed, or if the service worker code 150 is outdated. If the service worker code 150 is not installed or is outdated, the browser application 145 may send a request for a service worker code 110 to the online system 130. The browser application 145 may then download the service worker code 150 from the online system 130 and may install the service worker code 150 locally. Once the service worker code 150 is installed, the browser application 145 can evaluate or parse the service worker code 150 and access its stored data 160 each time a new request for the online system 130 is originated by the client device 140.

In some examples, the browser application 145 may also include cookies. Cookies are temporary files stored by the browser application 145. In some examples, cookies may provide the browser application 145 stateful information that may be later accessed by a webpage. The browser application 145 may access information stored in the cookies to enable certain features provided by the online system 130. For example, after a user has authenticated with an online system 130, a cookie stored in a browser application 145 of a client device 140 stores an identifier of the authentication. Each time the browser application 145 communicates with the online system 130, the browser application 145 retrieves the identifier from the cookie and provides the identifier to the online system 130. By doing this, the online system 130 is able to recognize the authenticated user account associated with the browser application 145 so that the online system 130 can send information that is relevant to the authenticated user account back to the browser application 145. In some examples, the data stored in the cookies are additionally or alternatively stored in one or more service worker codes 150.

The online system 130 may provide consumable media content and online services over the network 120 to the client device 140. For example, the online system 130 can provide search results, text, images, or video content, or may fulfill an online purchase or authenticate a user ID or device responsive to information received from a client device 140.

The online system 130 includes a service worker code generation module 135. The service worker code generation module 135 can generate a new service worker code 150 upon receiving the request for a service worker code 110 from the client device 140. In some examples, the request for a service worker code 110 may include data to be stored in the service worker code 150. The service worker code generation module 135 may generate a new service worker code 150 by modifying source code of a service worker code 150 to embed the stored data 160. The online system 130 may transmit the new service worker code 150 with the stored data 160 to the client device 140 to be installed by the browser application 145. In some aspects, the stored data 160 may include data specific to the client device 140, data associated with a user of the client device 140, and/or data contained in a web page provided to the client device 140. In some aspects, the stored data 160 may be used to generate cookies in the browser application 145 if a specific cookie is not available or has been deleted. As such, the service worker code 150 may be able to reliably generate new versions of a specific cookie across multiple online sessions, thus improving the usability of the web page using the service worker code 150.

In some aspects, the stored data 160 may include a randomly generated identifier for identifying the service worker code 150. That is, the service worker code generation module 135 may generate a new random identifier and may embed the identifier into the service worker code 150 as stored data 160. The identifier may have a predetermined structure. For example, the identifier may have a predetermined number of bits or characters. In other aspects, the identifier may be generated based on information included in the request for a service worker code 110. For example, the client device 140 may include an identifier for an outdated service worker code 150 previously used by the browser application 145 in the request for a service worker code 110. Alternatively or additionally, the client device 140 may include a value derived from the identifier for the outdated service worker code 150 in the request for a service worker code 110. In these aspects, the service worker code generation module 135 may generate a new service worker code 150 by embedding the identifier (or the value derived from the identifier) of the outdated service worker code 150 in the stored data 160 of the new service worker code 150. In other aspects, the service worker code generation module 135 generates a new identifier to be embedded in the stored data 160 of the new service worker code 150 and stores an association between the new identifier and the identifier of the outdated service worker code 150.

In some aspects, the stored data 160 embedded in service worker codes 150 may be inserted as constant values. Moreover, the values may be inserted as global values. The browser application 145 may retrieve the embedded global values by parsing the service worker code 150 to access the constant values. By dynamically generating a new service worker code 150 upon receiving the request for a service worker code 110, the service worker code generation module 135 may generate a different service worker code 150 for each client device 140. As such, the service worker code generation module 135 may store information that is specific to each client device 140 in a corresponding service worker code 150. Moreover, the service worker code 150 may include code for accessing client device specific information and may use the client device specific information accordingly. For example, when a browser application 145 need to refresh a web page for a user, the browser application may parse a service worker code 150 to retrieve the previous user authentication ID in the stored data 160 in the service worker code 150 to avoid sending login request to the online system.

In some aspects, when accessing a value stored in the client device 140, the browser application 145 (e.g., the JavaScript of the browser application 145) may first determine if the value is stored in a cookie. If the value is stored in a cookie, the browser application 145 may access the cookie to retrieve the value. If the value is not stored in a cookie (e.g., if the cookie has been deleted), and a service worker code 150 is installed on the client device 140, the browser application 145 may parse the service worker code 150 to determine if the value is embedded in the stored data 160 of the service worker code 150. If the value is stored in the service worker code 150, the browser application 145 retrieves the value. Additionally or alternatively, the service worker code 150 may cause the browser application 145 to generate a cookie that stores the value. If a service worker code 150 is not installed, the browser application 145 may transmit a request for a service worker code 110 that includes the value in its stored data 160 to the online system 130. The service worker code generation module 135 may then generate a service worker code 150 with the value embedded in its stored data 160 to be transmitted to the client device 140. The client device 140 may then install the service worker code 150.

Figure 2:
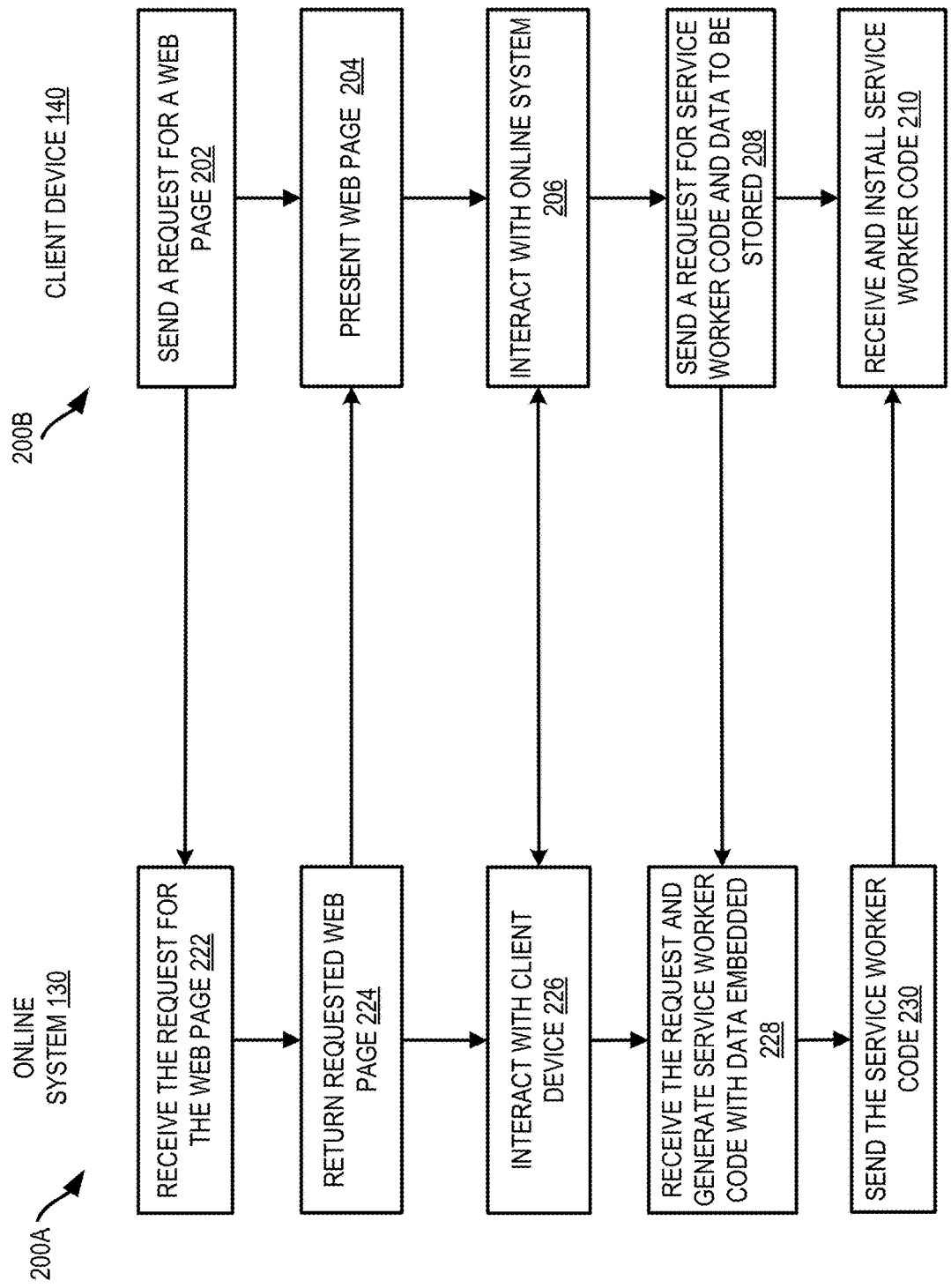
FIG. 2 shows several flow diagrams that illustrate several processes for storing information in a web browser through dynamically generating service worker code, according to some aspects described herein.

Examples of Operations for Storing Information in a Web Browser by Dynamically Generating Service Worker Code FIG. 2 illustrates several flow diagrams that illustrate several processes 200A, 200B, and 200C for storing information in a web browser through dynamically generating service worker code, according to some aspects described herein. FIG. 2 will be described together with FIG. 3. FIG. 3 is an example of a service worker code before and after storing data, according to some aspects described herein. FIGS. 2-3 will be described with respect to the systems shown in FIG. 1; however any suitable system according to this disclosure may be employed. In particular, the process 200A illustrates aspects of an online system 130 and the process 200B illustrates aspects of a client device 140. The processes 200A and 200B are described together below.

At block 202, the client device 140 sends a request for a web page to the online system 130. The client device 140 may execute its browser application 145 to send the request to access the web page. The request may be sent via the network 120. At block 222, the online system 130 receives the request for the web page.

At block 224, the online system 130 returns the requested web page to the client device 140. The requested web page may include JavaScript code to be executed on a JavaScript engine of the browser application 145. In some aspects, the online system 130 may also return a service worker code 150 to be installed by the browser application 145 along with the requested web page. The service worker code 150 may be JavaScript code. The requested web page code and the service worker code 150 (after installation) may be simultaneously executed by the browser application 145. A user of the client device 140 may be unaware of the existence or execution of the service worker code 150.

At block 204, the client device 140 presents the web page to a user of the client device 140. The user may interact with the web page. For example, the user may refresh the web page, add an item to a shopping cart, click on an image, click on a link to a subdomain of the web page, etc. The user interactions may create requests. At block 206, the client device 140 interacts with the online system 130. In some aspects, the client device 140 may interact with the online system 130 to fulfill the requests caused by user interaction. The client device 140 may transmit the requests to the online system 130.

At block 226, the online system 130 interacts with the client device 140. In some aspects, the online system 130 may fulfill the requests sent from the client device 140. For example, if the user requested to access a subdomain of the web page, the online system 130 may generate or retrieve the web page for the subdomain and send the new web page to the client device 140 to be displayed on the browser application 145. If the user requests a login attempt with the new log-in information, the online system 130 may authenticate the new log-in information and provide web pages to the browser application 145 that are accessible by authenticated users. In some aspects, the online system 130 may generate cookies based on the interactions between the online system 130 and the client device 140. For example, the online system 130 may generate a cookie containing the new login authentication information. The online system 130 may transmit the cookie to the client device 140 to be stored in the browser application 145.

At block 208, the client device 140 sends a request for a service worker code 110 with stored data 160 to the online system 130. The request may be triggered by one of the interactions between the client device 140 and the online system 130. For example, when a user supplies log-in information in a request to log into a web page, the client device 140 may send a request for a service worker code 110 to include stored data 160 embedded with the log-in information. In other examples, the request for the service worker code 110 may include a request for a cookie or information in a cookie generated in a previous step to be included in the stored data 160.

At block 228, the online system 130 receives the request and generates a service worker code 150 embedded with stored data 160. The online system 130 may execute a service worker code generation module 135 to generate the service worker code 150. The service worker code generation module 135 may embed the stored data 160 into the source code of an "empty" service worker code 150. An empty service worker code 150 may be a service worker code 150 that includes only the source code and no additional stored data 160. In some aspects where the client device 140 did not specify a particular service worker code 150, the online system 130 may generate a service worker code 150 that is required by the browser application 145 to allow the browser application 145 to perform operations. Alternatively, the online system 130 may generate a service worker code 150 that is not required by the browser application 145. In other aspects, the online system 130 may generate the service worker code 150 identified by the client device 140.

As one particular example of service worker code generation, FIG. 3 depicts a service worker code before and after storing data. The source code of the service worker code before storing data includes constant global variables GLOBAL_VAR1 assigned a value of 100 and GLOBAL- _VAR5 assigned a value of "TEMP," as well as an installation hook. The installation hook may cause a client device 140 to automatically install a service worker code 150 after the service worker code 150 is received by the client device 140. The service worker code 150 before storing data also includes comments for describing the variables and the installation hook. In some aspects, the service worker code 150 before storing data may include other comments.

The service worker code 150 after storing data may include all service worker code 150 before storing data, as well as stored data 160 assigned to new constant global variables. The stored data 160 embedded in the service worker code 150 depicted in FIG. 3 are a device identifier for the client device 140 of "2," assigned to the global variable DEVICE_ID, and a username of a user of the client device 140 "USER1," assigned to the global variable USER_NAME. Other examples of stored data 160 include other data specific to the client device 140 such as an IP address, data associated with a user of the client device 140 such as a user profile, data contained in a web page provided to the client device 140 such as shopping cart items, etc.

In some aspects, the service worker code 150 after storing data may include the stored data 160 embedded as global values, constant values, both, or in the comments. For example, the stored data 160 may be embedded in the service worker code 150 according to rules that are known to the browser application 145. The rules can include, for example, the beginning and end positions of the stored data 160 being marked with special characters (e.g., "#," "&," "%," "/") in the comment section. The rules can also include the stored data 160 being assigned as a value to a specific global variable or constant variable, such as DEVICE_ID and USER_NAME shown in FIG. 3. In some aspects, the stored data 160 may include images, audio, or video. The data may be encoded as a string in the service worker code 150. The string may be assigned to a variable or may be located in the comments of the service worker code 150. The browser application 145 may decode the string to retrieve the files. In some aspects, the stored data 160 may be encrypted and the browser application 145 may include code for decrypting the stored data 160. In some aspects, the service worker code 150 may have a size limit (e.g., 50 megabytes) depending on the cache limit of the JavaScript engine. This size limit may pose an upper limit on the size of the data to be stored in service worker code. In additional examples, the online system 130 may embed the data to be stored in more than one service worker code.

Referring back to FIG. 2, at block 230, the online system 130 sends the service worker code 150 with the embedded stored data 160 to the client device 140. At block 210, the client device 140 receives and installs the service worker code 150. The browser application 145 executes the installation hook in the service worker code 150 for installation.

Figure 4:
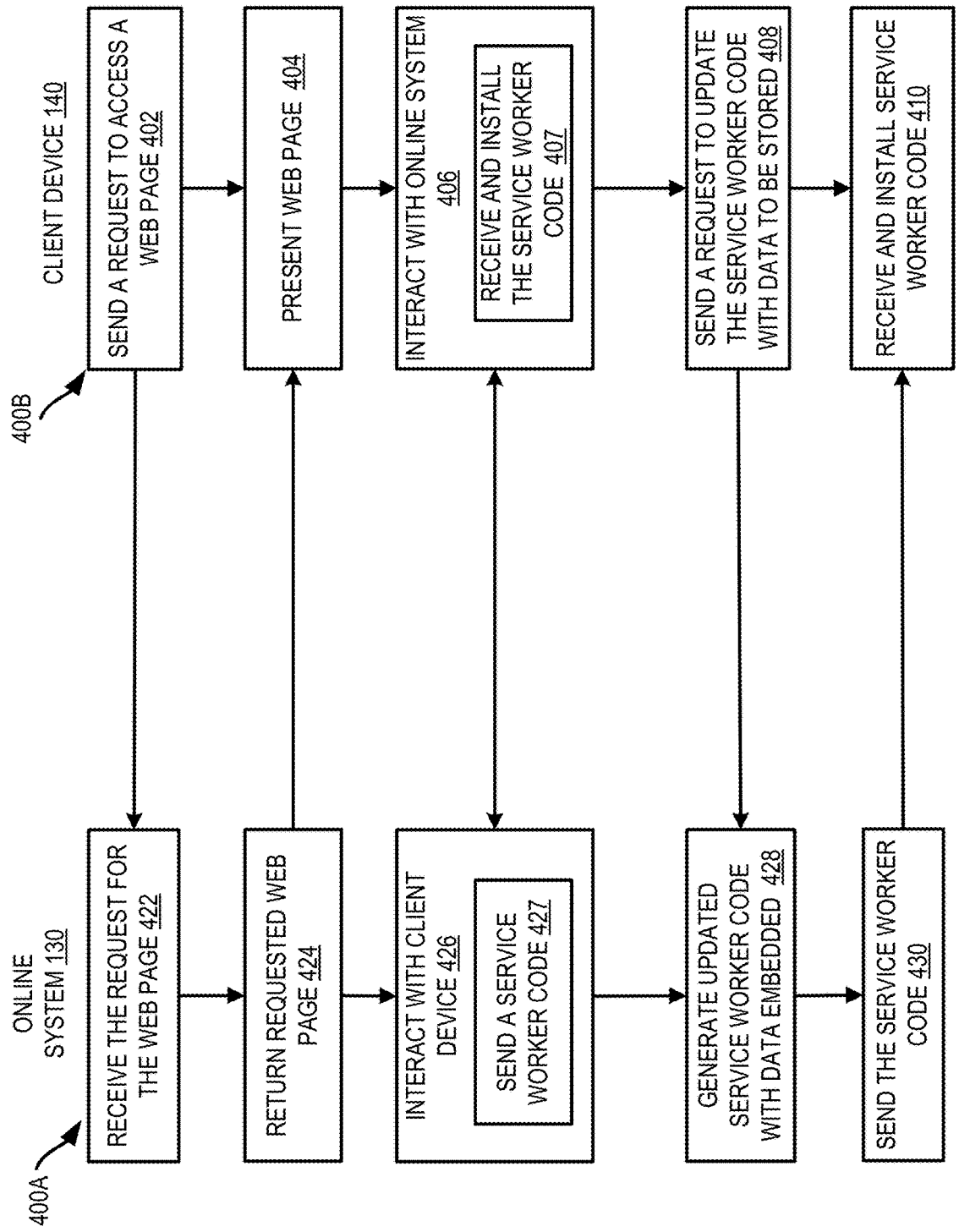
FIG. 4 shows several flow diagrams that illustrate several processes for storing information in a web browser through updating a service worker code, according to some aspects described herein.

FIG. 4 includes several flow diagrams that illustrate several processes 400A and 400B for validating online activities through proof-of-work techniques, according to some aspects described herein. FIG. 4 will be described with respect to the systems shown in FIG. 1; however any suitable system according to this disclosure may be employed. In particular, process 400A illustrates aspects of an online system 130, and process 400B illustrates aspects of a client device 140. The processes 400A and 400B are described together below.

At block 402, the client device 140 sends a request for a web page to the online system 130. At block 422, the online system 130 receives the request for the web page. At block 424, the online system 130 returns the requested web page to the client device 140. At block 404, the client device 140 presents the web page to a user of the client device 140. Blocks 402, 404, 422, and 424 are similar to blocks 202, 204, 222, and 224 described above with respect to FIG. 2, respectively.

At blocks 406 and 426, the client device 140 and the online system 130 interact with each other in a way similar to blocks 206 and 226 described above with respect to FIG. 2, respectively. At some point during the interaction, the online system 130 sends a service worker code 150 to the client device 140 at block 427 to implement certain functions, such as performing background computations. At block 407, the client device 140 receives and installs the service worker code 150 and executes the service worker code 150 as needed.

At block 408, the client device 140 sends a request to update the service worker code 150 with stored data 160 to the online system 130. Similar to block 208 described with respect to FIG. 2, the request may be triggered by one of the above-mentioned interactions between the client device 140 and the online system 130. An interaction may cause the client device 140 to parse the stored data 160 of its installed service worker codes 150 for a particular data. In some aspects, the browser application 145 may include JavaScript that is executable to implement a logic to search its installed service worker codes 150 for the particular data in their stored data 160. If the browser application 145 does not find the particular data, the client device 140 may determine that an update to its installed service code workers 150 that includes the particular data is required. In some aspects, the client device 140 may identify a particular installed service worker code 150 to be updated by including an identifier of the particular installed service worker code 150 and the data to be stored in the request. The identifier may be a name or a function associated with the service worker code 150. The online system 130 may store associations between particular service worker codes 150 and their identifiers. In some aspects, the identified service worker code 150 in the request may be a service worker code 150 with existing stored data 160. The request may include new stored data 160 to replace or be added to the existing stored data 160.

At block 428, the online system 130 receives the request and generates an updated service worker code 150 embedded with the requested stored data 160. In some aspects, generating an updated service worker code 150 may involve modifying the identified service worker code 150. Alternatively, generating an updated service worker code 150 may involve generating an entirely new service worker code 150 to replace the identified service worker code 150. In some aspects, the source code of a service worker code 150 may include a version number. Generating an updated version of a service worker code 150 may include modifying the version number of the identified service worker code 150.

At block 430, the online system 130 sends the updated service worker code 150 to the client device 140. At block 410, the client device 140 receives and installs the updated service worker code 150. The browser application 145 may modify or replace the installed service worker code 150 according to the version number of updated service worker code 150 sent from the online system 130. For example, if the browser application 145 may determine that the version number of the received service worker code 150 is newer than the version of the installed service worker code 150, the browser application 145 may replace the installed service worker code 150 with the newly received service worker code 150. Blocks 408, 428, 430, and 410 may be repeated to store additional data or updated data in the service worker code installed on the client device.

Figure 5:
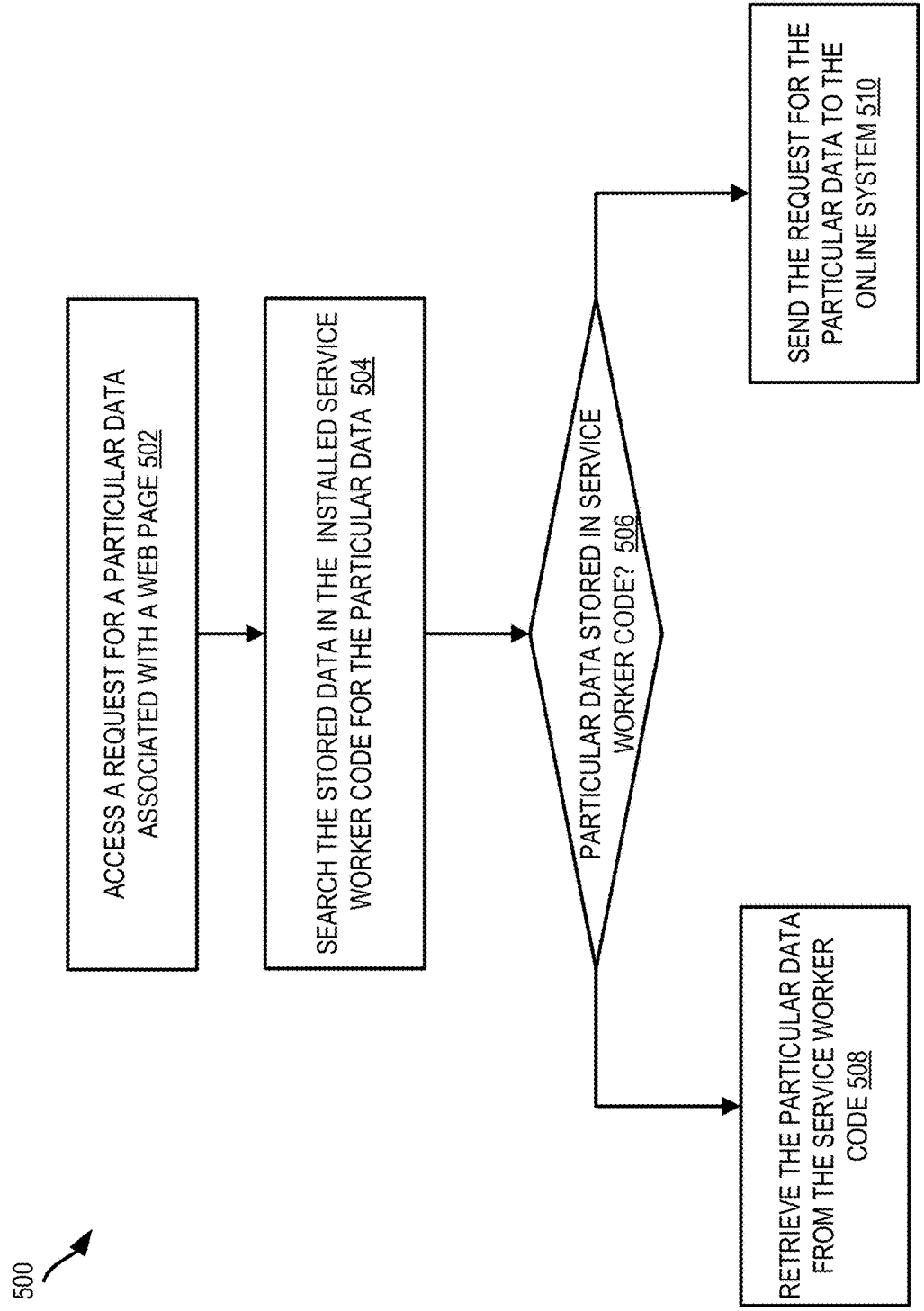
FIG. 5 illustrates a flow diagram of a process for providing information to a browser application using stored data in a service worker code, according to some aspects described herein.

FIG. 5 illustrates a flow diagram of a process 500 for providing information to a browser application 145 using stored data 160 in a service worker code 150, according to some aspects described herein. FIG. 5 will be described with respect to the systems shown in FIG. 1; however any suitable system according to this disclosure may be employed.

At block 502, the client device 140 accesses a request for a particular data associated with a web page. For example, the particular data may be a username, and the request for the username may be received due to a user refreshing a web page, causing the browser application 145 to no longer have access to the username. The web page may be displayed in a browser application 145 of the client device 140. The browser application 145 may be executing a previously installed service worker code 150 including stored data 160. Based on the request for the particular data, the client device 140 (e.g., the JavaScript of the browser application 145) may search the stored data 160 of the previously installed service worker code 150 for the username. If the particular data is located in the stored data 160, the client device 140 may retrieve the particular data without sending a request for the particular data to the online system 130.

At block 504, the browser application 145 searches the stored data 160 in the installed service worker code 150 for the particular data. In some aspects, the browser application 145 may search the stored data 160 by executing the portion of the JavaScript configured to search stored data 160 in the service worker code 150. The installed service worker code 150 may be registered with a particular domain or a subdomain of the web page. If the service worker code 150 is installed and registered for a subdomain, the stored data 160 in the service worker code 150 may be accessed to respond to a request for the subdomain or the domain. In some implementations, if the service worker code 150 is registered with the domain, the stored data 160 in the service worker code 150 may be accessed to respond to requests for the domain, but not the subdomain. In other implementations, stored data 160 in a service worker code 150 registered with a domain may be accessed to respond to requests for the domain or subdomains of the domain.

At block 506, the browser application 145 determines if the particular data is stored in the stored data 160 of the service worker code 150 by parsing the stored data 160. The browser application 145 may search the variables or comments in the service worker code 150 for the particular data. In some aspects, the browser application 145 may include rules for identifying particular data in the service worker code 150, such as the marking of the beginning and end of the particular data with special characters mentioned above. The browser application 145 may decode or decrypt the stored data 160 to identify any included particular data. If the particular data is stored in the stored data 160, process 500 continues to block 508. If the particular data is not stored in the stored data 160, process 500 continues to block 510.

At block 508, the browser application 145 retrieves the particular data from the service worker code 150. The browser application 145 may extract the value (e.g., the particular data) assigned to the identified variable or comment that embeds the particular data. The browser application 145 may then utilize the particular data to fulfill the request for the particular data. At block 510, the client device 140 sends a request for the particular data to the online system 130. In response to receiving the request, the online system 130 sends the request data along with other information to the client device 140 to allow the browser application 145 to fulfill the request. In some examples, the online system 130 may also execute the service worker code generation module 135 to generate a new service worker code 150 that includes the particular data embedded into its stored data 160. Alternatively, the service worker code generation module 135 may generate a service worker code 150 that is an updated version of the service worker code 150 installed on the client device 140. For example, the updated version of the service worker code 150 may have the same identifier as the installed service worker code 150. The online system 130 may then transmit the new service worker code 150 to the client device 140 to be installed, to allow the browser application 145 to fulfill future requests for the particular data using the stored data in the service worker code.

Although the above description focuses on storing data browser applications, similar systems and methods may be applied to other applications executing on the client device 140. To store data locally on the client device for the application, the client device may embed the data in the source code of a plug-in of an application or other components of the application in a way similar to embedding data in a service worker code 150 of a web page. For example, the data can be embedded in the source code of the plug-in or applications as a global value, a constant value, both, in the comments, or some combination thereof. The data can also be embedded in the source code as stored data 160 in other ways as long as the application understands how to extract the stored data 160 and the stored data 160 does not interfere with the functions of the application. In some examples, the added data may be embedded in the source code according to rules that are known to the application. The rules can include, for example, the beginning and end positions of the added data being marked with special characters (e.g., "#," "&," "%," "/") in the comment section. Updates to the stored data 160 or additional stored data 160 may be embedded in new versions of plug-ins or new versions of the application. The application may access the stored data 160 embedded in its plug-in by parsing the source code of the installed plug-in in a way similar to parsing the service worker code.

Figure 6:
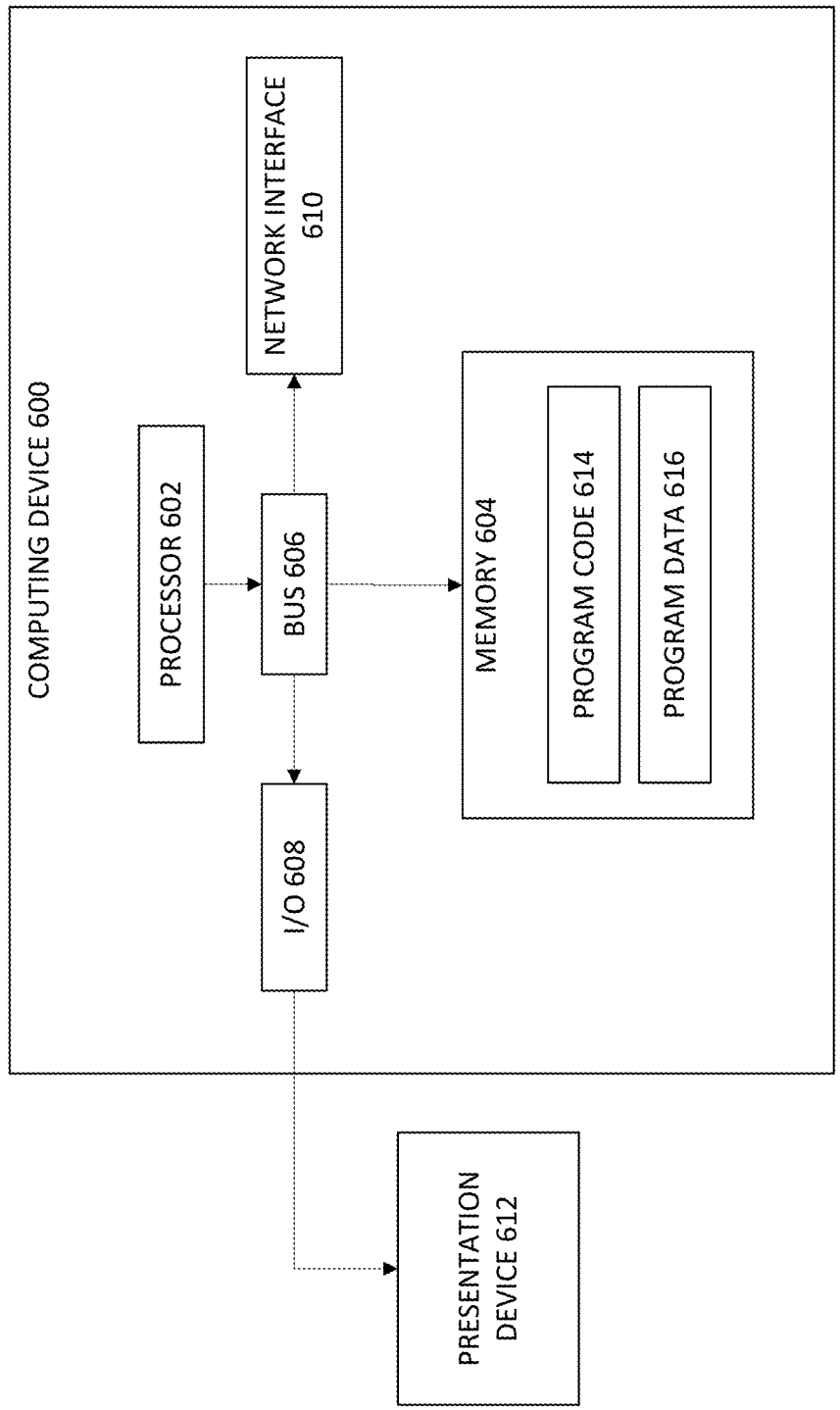
FIG. 6 is a diagram depicting an example of a computing system suitable for implementing aspects of the techniques and technologies described herein.

Example of a Computing System for Storing Information in a Web Browser by Dynamically Generating Service Worker Code Any suitable computing system or group of computing systems can be used to perform the operations for the machine-learning operations described herein. For example, FIG. 6 is a block diagram depicting an example of a computing device 600, which can be used to implement the online system 130 and/or the client devices 140. The computing device 600 can include various devices for communicating with other devices in the computing environment 100, as described with respect to FIG. 1. The computing device 600 can include various devices for performing one or more operations described above with reference to FIGS. 1-5.

The computing device 600 can include a processor 602 that is communicatively coupled to a memory 604. The processor 602 executes computer-executable program code 614 stored in the memory 604, accesses program data 616 stored in the memory 604, or both. Program code 614 may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 602 include a microprocessor, an application-specific integrated circuit, a field-programmable gate array, or any other suitable processing device. The processor 602 can include any number of processing devices, including one. The processor 602 can include or communicate with a memory 604. The memory 604 stores program code that, when executed by the processor 602, causes the processor to perform the operations described in this disclosure.

The memory 604 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The computing device 600 may also include a number of external or internal devices such as input or output devices. For example, the computing device 600 is shown with an input/output interface 608 that can receive input from input devices or provide output to output devices. A bus 606 can also be included in the computing device 600. The bus 606 can communicatively couple one or more components of the computing device 600.

The computing device 600 can execute program code 614 that includes the service worker code generation module 135 and/or the browser application 145. The program code 614 for the service worker code generation module 135 and/or the browser application 145 may be resident in any suitable computer-readable medium and may be executed on any suitable processing device. Executing the service worker code generation module 135 or the browser application 145 can configure the processor 602 to perform the operations described herein.

In some aspects, the computing device 600 can include one or more output devices. One example of an output device is the network interface 610 depicted in FIG. 6. A network interface 610 can include any device or group of devices suitable for establishing a wired or wireless data connection to one or more data networks described herein, such as the network 120. Non-limiting examples of the network interface 610 include an Ethernet network adapter, a modem, etc.

Another example of an output device can be the presentation device 612 depicted in FIG. 6. A presentation device 612 can include any device or group of devices suitable for providing visual, auditory, or other suitable sensory output. Non-limiting examples of the presentation device 612 include a touchscreen, a monitor, a speaker, a separate mobile computing device, etc. In some aspects, the presentation device 612 can include a remote client-computing device that communicates with the computing device 600 using one or more data networks described herein, such as the network 120. In other aspects, the presentation device 612 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A computer-implemented method comprising:
   sending, by a client computing system, data to an online system, wherein the data is to be embedded in a service worker code;
   receiving, by the client computing system from the online system, the service worker code embedded with the data;
   storing, by the client computing system, the service worker code that is embedded with the data, wherein the data is embedded in a portion of a source code of the service worker code and the portion of the source code is independent of functions of the service worker code, wherein the data is independent of the functions of the service worker code;
   receiving, by the client computing system, a request for a particular data associated with a web page;
   parsing, by the client computing system, the portion of the source code of the service worker code that is independent of the functions of the service worker code to retrieve the requested particular data in response to the request for the particular data; and
   updating, by the client computing system, the web page based on the retrieved particular data.

2. The method of claim 1, wherein the requested particular data is stored as a global value or a constant value in the source code of the service worker code.

3. The method of claim 1, further comprising:
   determining that the service worker code does not contain the requested particular data; and
   sending, to an online system, a request for the particular data.

4. The method of claim 1, further comprising sending a request to store the data in the service worker code along with sending the data, wherein the service worker code was previously installed on the client computing system prior to sending the request to store the data, and wherein storing the service worker code comprises replacing the previously installed service worker code with the service worker code embedded with the data.

5. The method of claim 1, wherein the particular data associated with the web page comprises one or more of:
   data specific to a client device presenting the web page;
   data associated with a user of the client device operating the web page; or
   data contained in the web page.

6. A non-transitory, computer-readable storage medium having program code that is executable by a processor device to cause a computing device to perform operations, the operations comprising:
   receiving, from a client device, data to be stored in a service worker code and a request to store the data;
   modifying a portion of a source code of a particular service worker code to include the data to be stored, wherein the portion of the source code is independent of functions of the service worker code, and wherein the data is independent of the functions of the service worker code; and transmitting the modified service worker code to the client device in response to the request to store data.

7. The non-transitory, computer-readable storage medium of claim 6, wherein modifying the source code of the particular service worker code comprises adding the data to be stored as a global value or a constant value in the source code.

8. The non-transitory, computer-readable storage medium of claim 6, further comprises modifying a version number of the particular service worker code and transmitting the version number along with the modified service worker code to the client device, wherein the client device is configured to install the particular service worker code based on the version number.

9. The non-transitory, computer-readable storage medium of claim 6, wherein the particular service worker code has been installed on the client device and wherein the request to store data further comprises an identifier of the particular service worker code.

10. The non-transitory, computer-readable storage medium of claim 9, wherein the particular service worker code was sent to and installed on the client device prior to receiving the request to store data, and wherein the installed particular service worker code is replaced with the modified service worker code.

11. The non-transitory, computer-readable storage medium of claim 6, wherein the request to store data further comprises a request for a new service worker code that has not been installed on the client device, and wherein the particular service worker code comprises the new service worker code.

12. The non-transitory, computer-readable storage medium of claim 6, wherein the data to be stored comprises one or more of:
    data specific to the client device;
    data associated with a user of the client device; or
    data contained in a web page provided to the client device.

13. A system, comprising:
    a processor device; and
    a non-transitory computer-readable storage medium having program code that is executable by the processor device to cause the processor device to perform operations, the operations comprising:
        receiving, from a client device, data to be stored in a service worker code and a request to store the data;
        modifying a portion of a source code of a particular service worker code to include the data to be stored, wherein the portion of the source code is independent of functions of the service worker code, and wherein the data is independent of the functions of the service worker code; and
        transmitting the modified service worker code to the client device in response to the request to store data.

14. The system of claim 13, wherein modifying the source code of the particular service worker code comprises adding the data to be stored as a global value or a constant value in the source code.

15. The system of claim 13, wherein the operations further comprise:
    modifying a version number of the particular service worker code; and
    transmitting the version number along with the modified service worker code to the client device, wherein the client device is configured to install the particular service worker code based on the version number.

16. The system of claim 13, wherein the particular service worker code has been installed on the client device and wherein the request to store data further comprises an identifier of the particular service worker code.

17. The system of claim 16, wherein the particular service worker code was sent to and installed on the client device prior to receiving the request to store data, and wherein the installed particular service worker code is replaced with the modified service worker code.

18. The system of claim 13, wherein the request to store data further comprises a request for a new service worker code that has not been installed on the client device, and wherein the particular service worker code comprises the new service worker code.

19. The system of claim 13, wherein the data to be stored comprises one or more of:
    data specific to the client device;
    data associated with a user of the client device; or
    data contained in a web page provided to the client device.

* * * * *